US007206903B1

(12) United States Patent
Moir et al.

(10) Patent No.: US 7,206,903 B1
(45) Date of Patent: *Apr. 17, 2007

(54) METHOD AND APPARATUS FOR RELEASING MEMORY LOCATIONS DURING TRANSACTIONAL EXECUTION

(75) Inventors: Mark S. Moir, Somerville, MA (US); Maurice P. Herlihy, Brookline, MA (US); Quinn A. Jacobson, Sunnyvale, CA (US); Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 10/895,519

(22) Filed: Jul. 20, 2004

(51) Int. Cl.
*G06F 12/00* (2006.01)

(52) U.S. Cl. .................. 711/145; 711/130; 711/143; 711/144; 711/150; 711/151; 711/156; 711/158; 718/107

(58) Field of Classification Search ............... None
See application file for complete search history.

(56) References Cited

U.S. PATENT DOCUMENTS 6,128,713 A * 10/2000 Eisler et al. ............... 711/159
6,425,048 B1 * 7/2002 Kaganoi .................... 711/108
6,493,741 B1 * 12/2002 Emer et al. ................ 718/107
6,675,192 B2 * 1/2004 Emer et al. ................ 718/107
2003/0126186 A1 * 7/2003 Rodgers et al. ........... 709/107

* cited by examiner

*Primary Examiner*—Kevin Verbrugge
(74) *Attorney, Agent, or Firm*—Park, Vaughan & Fleming LLP

(57) ABSTRACT

One embodiment of the present invention provides a system for releasing a memory location from transactional program execution. The system operates by executing a sequence of instructions during transactional program execution, wherein memory locations involved in the transactional program execution are monitored to detect interfering accesses from other threads, and wherein changes made during transactional execution are not committed until transactional execution completes without encountering an interfering data access from another thread. Upon encountering a release instruction for a memory location during the transactional program execution, the system modifies state information within the processor to release the memory location from monitoring. The system also executes a commit-and-start-new-transaction instruction, wherein the commit-and-start-new-transaction instruction atomically commits the transaction's stores, thereby removing them from the transaction's write set while the transaction's read set remains unaffected.

30 Claims, 14 Drawing Sheets

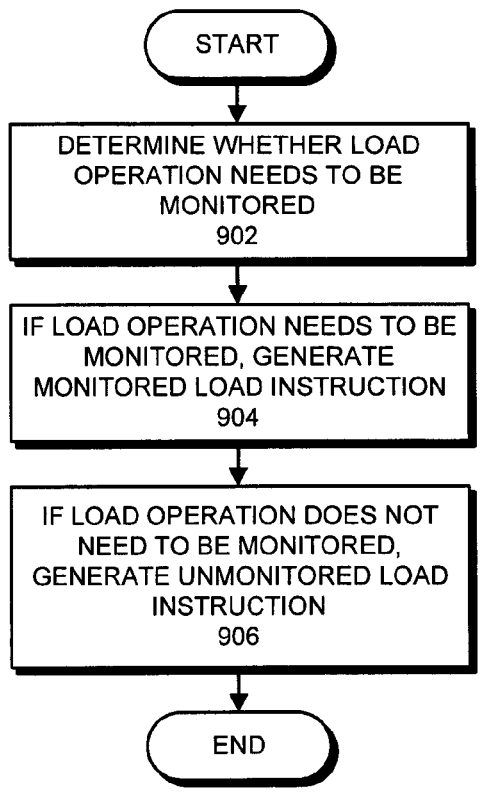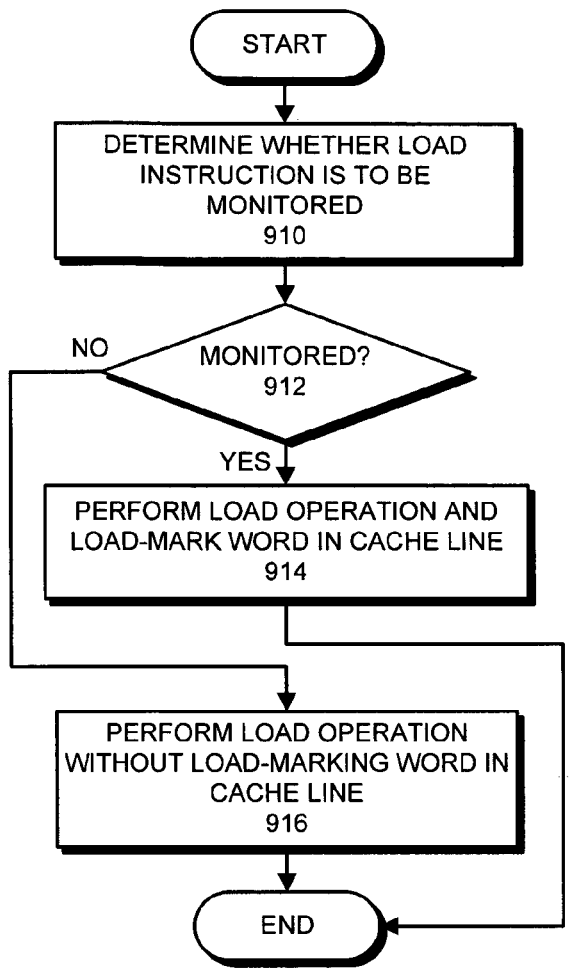
FIG. 9A
FIG. 9B

METHOD AND APPARATUS FOR RELEASING MEMORY LOCATIONS DURING TRANSACTIONAL EXECUTION

RELATED APPLICATION

The subject matter of this application is related to the subject matter in a non-provisional application by the same inventors as the instant application entitled, "Selectively Unmarking Load-Marked Cache Lines During Transactional Program Execution," having Ser. No. 10/764,412, and filing date 23 Jan. 2004, now U.S. Pat. No. 7,089,374, issued 8 Aug. 2006.

The subject matter of this application is additionally related to the subject matter in a co-pending non-provisional U.S. patent application by inventors Marc Tremblay, Quinn A. Jacobson and Shailender Chaudhry, entitled, "Selectively Monitoring Loads to Support Transactional Program Execution," having Ser. No. 10/637,168, and filing date 8 Aug. 2003.

BACKGROUND

1. Field of the Invention

The present invention relates to techniques for improving the performance of computer systems. More specifically, the present invention relates to a method and an apparatus to facilitate early release of memory locations during transactional program execution.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use of locks. A lock is typically acquired before a thread enters a critical section of code, and is released after the thread exits the critical section. If another thread wants to enter a critical section protected by the same lock, it must acquire the same lock. If it is unable to acquire the lock because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modern microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure. It also introduces significant software engineering concerns, such as avoiding deadlock.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Consequently, in these cases, the overhead involved in acquiring and releasing locks is largely wasted.

Hence, what is needed is a method and an apparatus that reduces the overhead involved in manipulating locks when accessing critical sections.

One technique to reduce the overhead involved in manipulating locks is to "transactionally" execute a critical section, wherein changes made during the transactional execution are not committed to the architectural state of the processor until the transactional execution completes without encountering an interfering data access from another thread. This technique is described in related U.S. patent application Ser. No. 10/637,168, entitled, "Selectively Monitoring Loads to Support Transactional Program Execution," by inventors Marc Tremblay, Quinn A. Jacobson and Shailender Chaudhry, filed on 8 Aug. 2003.

Load and store operations are modified so that, during transactional execution, they mark cache lines that are accessed during the transactional execution. This allows the computer system to determine if an interfering data access occurs during the transactional execution. If so, the transactional execution fails, and results of the transactional execution are not committed to the architectural state of the processor. On the other hand, if the transactional execution is successful in executing a sequence of instructions, results of the transactional execution are committed to the architectural state of the processor. Note that committing changes can involve, for example, committing store buffer entries to the memory system by ungating the store buffer.

Unfortunately, existing designs for systems that support transactional execution require the hardware to maintain state information about every memory location accessed by the transaction until the transaction completes. Because the hardware resources needed to maintain such state are necessarily bounded, existing designs are not able to accommodate larger transactions that can potentially access a large number of memory locations. For example, a non-blocking implementation of a dynamically sized data structure (such as a linked list) can potentially need to access a large number of memory locations during a single atomic transaction (for example, to scan down the linked list). Hence, what is needed is a method and an apparatus that reduces the amount of state information that the system needs to keep track of during transactional program execution.

Unfortunately, problems can arise while marking cache lines. If a large number of cache lines are loaded, for example, we are more likely to overflow a particular cache set. Furthermore, the marked cache lines cannot be easily moved out of cache until the transactional execution completes, which also causes performance problems.

Hence, what is needed is a method and an apparatus that reduces the number of cache lines that need to be marked during transactional program execution.

One technique for solving this problem uses variations of a load instruction, which causes a memory location to be loaded with an explicit time-to-live value. A release instruction (effectively) decrements every such memory location's time-to-live value, and those locations whose time-to-live value becomes zero are released from the transaction's read set. The principal limitation of this interface is that it fits poorly with accepted software engineering practice. This technique is described in the related U.S. patent application entitled "Selectively Unmarking Load-Marked Cache Lines During Transactional Program Execution," having Ser. No. 10/764,412, and filing date 23 Jan. 2004, now U.S. Pat. No. 7,089,374, issued 8 Aug. 2006.

Suppose procedure P loads several locations with a load instruction specifying a time-to-live value, and then calls procedure Q. If Q loads an address with a time-to-live value of one, and then uses the release instruction to release that address, the release instruction will have the unintended side-effect of indiscriminately decrementing the time-to-live value of every address previously loaded by P, which may be (and should be) unaware that Q used the release instruction. The system described in the related application has the further disadvantage that it uses "release counters," which limit the total number of releases that can be performed by a successful transaction; the need to know and reason about this is a significant problem for programmers.

Moreover, the techniques described above do not support modular software design in that they do no permit transactions to be nested: if P starts a transaction and calls Q, and then Q itself starts and commits a transaction, the effects of Q's transaction should be part of P's transactions in a seamless way. The techniques described above do not address how nested transactions can be supported and, in particular, how the nested transactions would interact with early release functionality.

Hence, what is needed is a method and an apparatus to facilitate early release of transactional memory without the above described problems.

SUMMARY

One embodiment of the present invention provides a system for releasing a memory location from transactional program execution. The system operates by executing a sequence of instructions during transactional program execution, wherein memory locations involved in the transactional program execution are monitored to detect interfering accesses from other threads, and wherein changes made during transactional execution are not committed until transactional execution completes without encountering an interfering data access from another thread. Upon encountering a release instruction for a memory location during the transactional program execution, the system modifies state information within the processor to release the memory location from monitoring.

In a variation of this embodiment, the system executes a commit-and-start-new-transaction instruction, wherein the commit-and-start-new-transaction instruction atomically commits the transaction's stores, thereby removing them from the transaction's write set while the transaction's read set remains unaffected.

In a variation of this embodiment, modifying state information within the processor involves changing the state of a corresponding load-marked word within a cache line to indicate that the load-marked word can be released from monitoring. If all load-marked words within a cache line are released from monitoring, the cache line can be evicted without aborting the transactional program execution.

In a variation of this embodiment, a load-marked cache line contains a bit for each word indicating whether the word has been load-marked. If all bits associated with the load-marked cache line indicate that the associated words are not load-marked, the load-marked cache line can be evicted without aborting the transactional execution.

In a further variation, the system sets a nesting-level variable to zero at the start of transactional program execution. This nesting-level variable indicates the depth of nested start-transactional-execution (STE) instructions. The system increments the nesting-level variable when a subsequent start-transactional-execution instruction is encountered, and decrements the nesting-level variable when a commit transactional execution instruction is encountered. If the nesting-level variable becomes zero, the transaction's values are transferred to the appropriate cache lines and then the cache lines associated with the transactional execution are committed to memory.

In a further variation, upon encountering a load instruction during the transactional execution, the system performs the corresponding load operation, and if the load instruction is a monitored load instruction, the system load-marks a corresponding word in the cache line to facilitate subsequent detection of an interfering data access to the cache line from another thread.

In a further variation, if an interfering data access from another thread is encountered during transactional execution, the system discards changes made during the transactional execution, and attempts to re-execute the sequence of instructions.

In a further variation, if an interfering data access from another thread is encountered during transactional execution, control branches to a previously-specified fail address.

In a further variation, if transactional execution completes without encountering an interfering data access from another thread, the system commits changes made during the transactional execution to the architectural state of the processor, and resumes normal non-transactional execution of the program past the sequence of instructions.

In a further variation, an interfering data access can include a store by another thread to a cache line that has been load-marked by a thread, or a load or a store by another thread to a cache line that has been store-marked by the thread.

BRIEF DESCRIPTION OF THE FIGURES

FIG. 9A presents a flow chart illustrating how monitored and unmonitored load instructions are generated in accordance with an embodiment of the present invention.

FIG. 9B presents a flow chart illustrating how monitored and unmonitored load instructions are executed in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
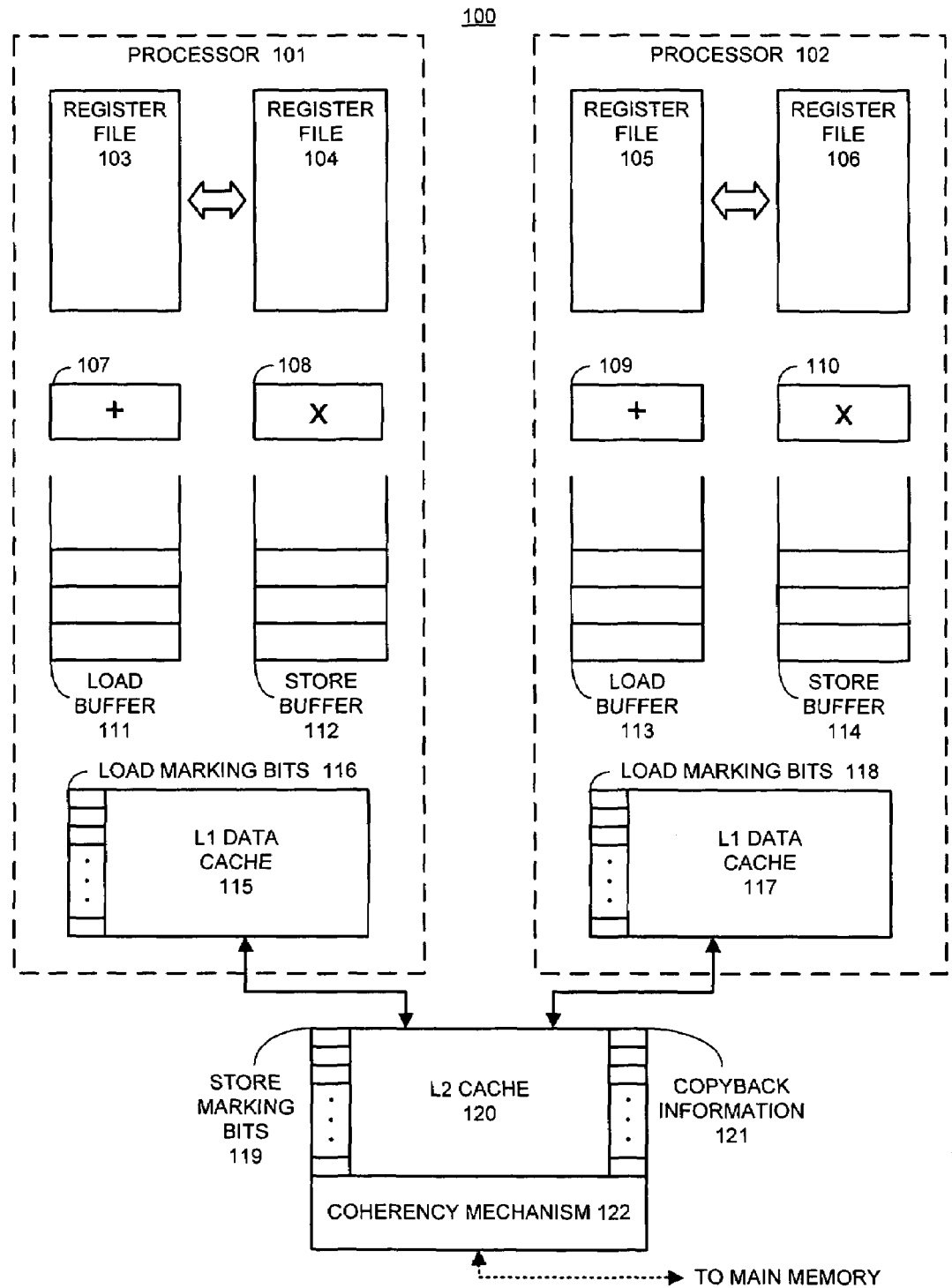
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that lines in L1 data cache 115 include load-marking bits 116, which indicate that a data value from the line has been loaded during transactional execution. These load-marking bits 116 are used to determine whether any interfering memory references take place during transactional execution as is described below with reference to FIGS. 3–8. Processor 101 also includes an L1 instruction cache (not shown).

Note that load-marking does not necessarily have to take place in L1 data cache 115. In general load-marking can take place at any level cache, such as L2 cache 120, or even in an independent structure. However, for performance reasons, the load-marking will likely take place at the cache level that is as close to the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where a cache line must be sent to another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3–8. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, we perform store-marking in the L1 data cache. (Note that the cache coherence protocol ensures that any other processor that subsequently modifies the same cache line will retrieve the cache line from the L1 cache.)

Executing a Critical Section

Figure 2A:
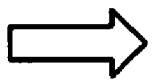
FIG. 2A illustrates how a critical section is executed in accordance with an embodiment of the present invention.

FIG. 2A illustrates how a critical section is executed. As is illustrated in the left-hand side of FIG. 2A, a thread that executes a critical section typically acquires a lock associated with the critical section before entering the critical section. If the lock has been acquired by another thread, the thread may have to wait until the other thread releases the lock. Upon leaving the critical section, the thread releases the lock. (Note that the terms "thread" and "process" are used interchangeably throughout this specification.)

A lock can be associated with a shared data structure. For example, before accessing a shared data structure, a thread can acquire a lock on the shared data structure. The thread can then execute a critical section of code that accesses the shared data structure. After the thread is finished accessing the shared data structure, the thread releases the lock.

In contrast, in the present invention, the thread does not acquire a lock, but instead executes a start-transactional-execution (STE) instruction before entering the critical section. If the critical section is successfully completed without interference from other threads, the thread performs a commit operation, to commit changes made during transactional execution. This sequence of events is described in more detail below with reference to FIGS. 3–8.

Note that in one embodiment of the present invention a compiler replaces lock-acquiring instructions with STE instructions, and also replaces corresponding lock releasing instructions with commit instructions. Note that there may not be a one-to-one correspondence between replaced instructions. For example, a single lock acquisition operation comprised of multiple instructions may be replaced by a single STE instruction (see the code sequence in FIG. 2B).

Note that in many cases we will want to maintain the ability to fall back on the lock in case we cannot make progress for some reason. Also, from a software engineering standpoint, it will often be desirable to transform the code only in common paths, and leave locking code intact in uncommon paths. To facilitate this, in transforming one critical section to execute transactionally, we can replace the lock-acquire with an STE instruction followed by code that reads the lock state transactionally and checks that the lock is not held.

Figure 2B:
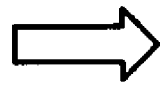
FIG. 2B illustrates another example of how a critical section is executed in accordance with an embodiment of the present invention.

The above discussion presumes that the processor's instruction set has been augmented to include an STE instruction and a commit instruction. These instructions are described in more detail below with reference to FIGS. 3–9. Note that the description provided for FIGS. 2A and 2B are provided to help the reader understand one way of using transactional memory.

Transactional Execution Process

Figure 3:
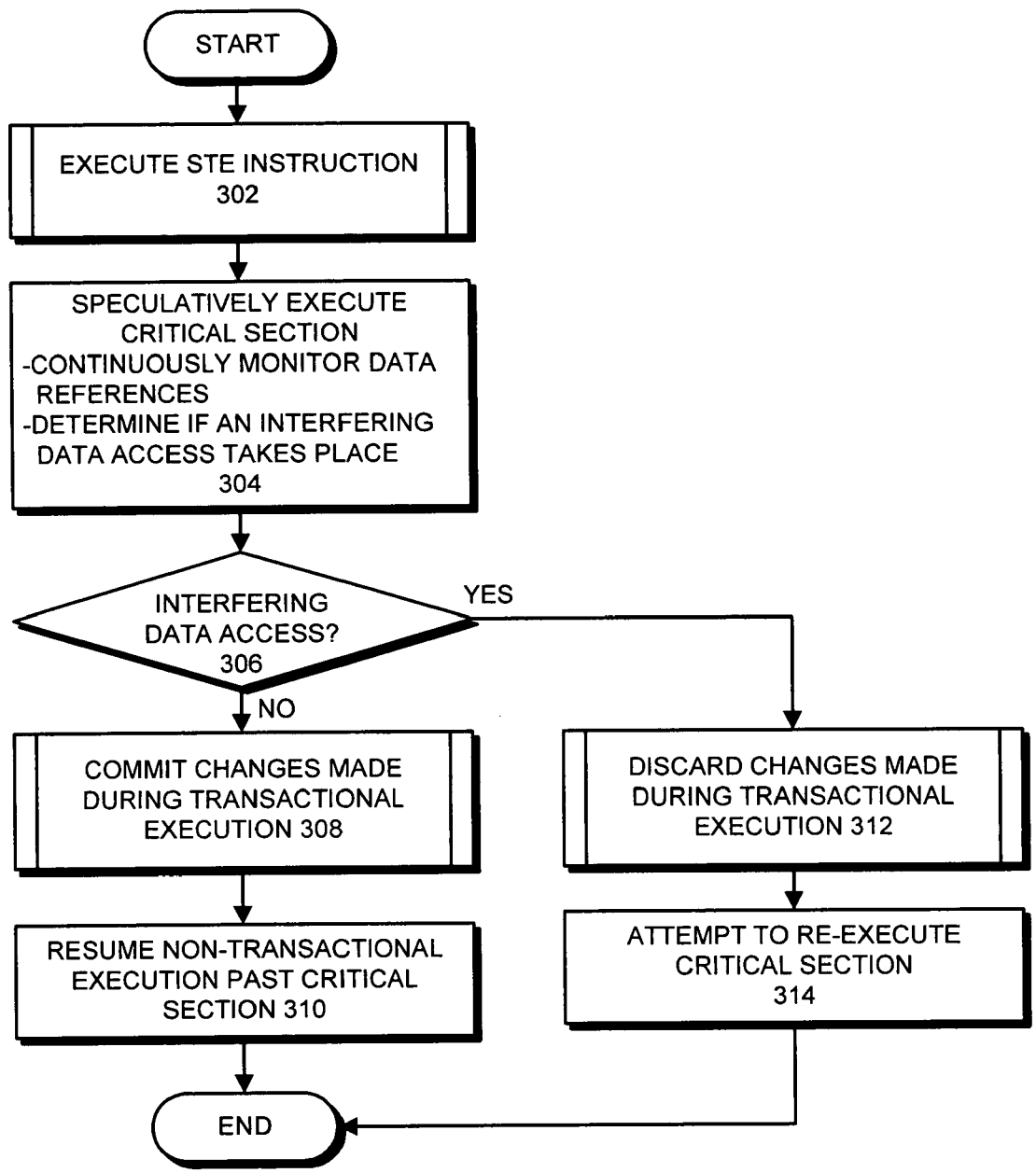
FIG. 3 presents a flow chart illustrating the transactional execution process in accordance with an embodiment of the present invention.

FIG. 3 presents a flow chart illustrating how transactional execution takes place in accordance with an embodiment of the present invention. A thread first executes an STE instruction prior to entering of a critical section of code (step 302). Next, the system transactionally executes code within the critical section, without committing results of the transactional execution (step 304).

During this transactional execution, the system continually monitors data references made by other threads, and determines if an interfering data access (or other type of failure) takes place during transactional execution. If not, the system atomically commits all changes made during transactional execution (step 308) and then resumes normal non-transactional execution of the program past the critical section (step 310).

On the other hand, if an interfering data access is detected, the system discards changes made during the transactional execution (step 312), and attempts to re-execute the critical section (step 314).

In one embodiment of the present invention, the system attempts to transactionally re-execute the critical section zero, one, two or more times. If these attempts are not successful, the system executes an alternative sequence of code in normal execution mode. This alternative code may additionally attempt to perform the transaction and will likely have the ability to revert back to the conventional technique of acquiring a lock on the critical section before entering the critical section, and then releasing the lock after leaving the critical section.

Note that an interfering data access can include a store by another thread to a cache line that has been load-marked by the thread. It can also include a load or a store by another thread to a cache line that has been store-marked by the thread.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

Figure 4:
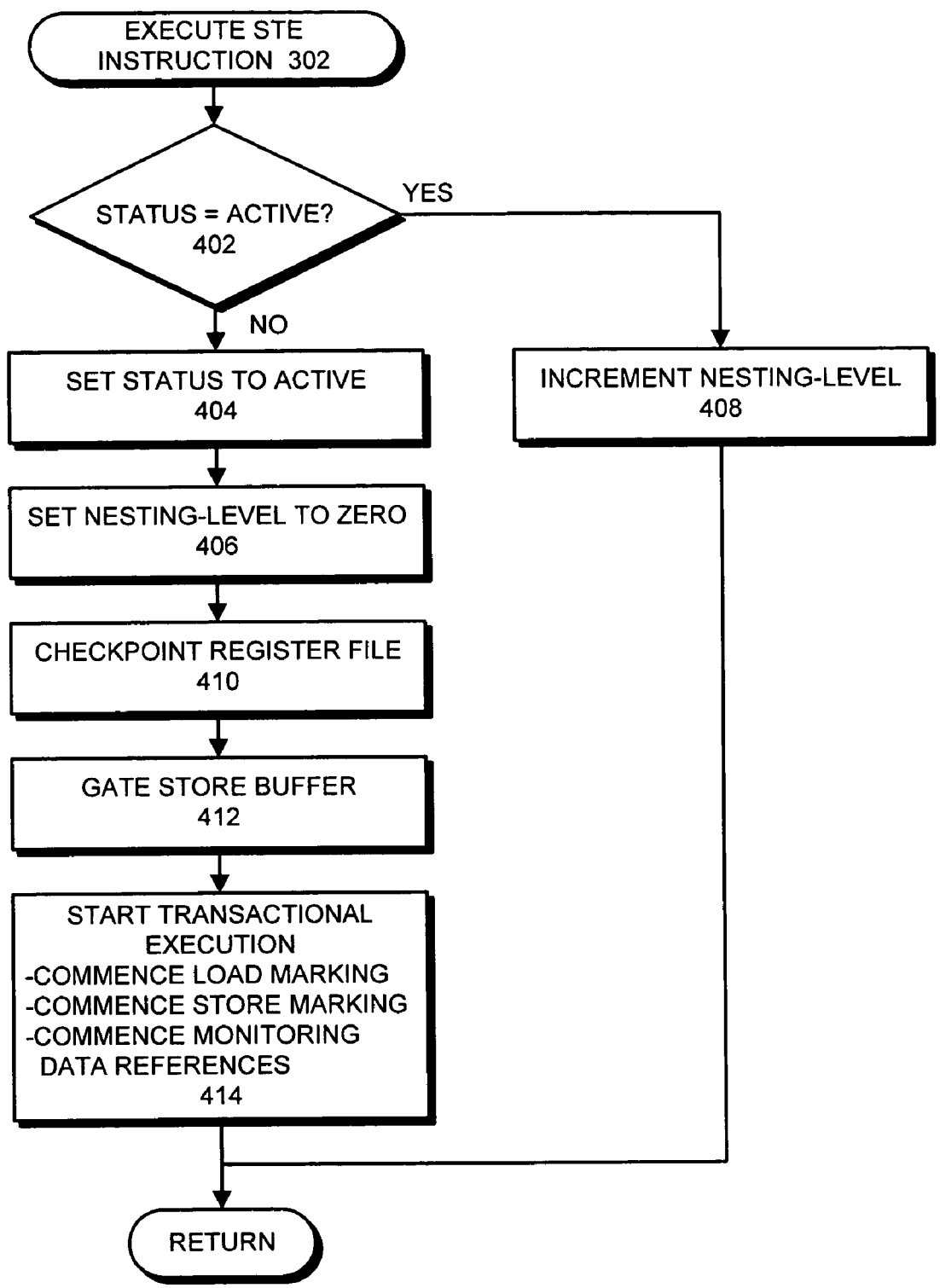
FIG. 4 presents a flow chart illustrating a start-transactional-execution (STE) operation in accordance with an embodiment of the present invention.

FIG. 4 presents a flow chart illustrating a start-transactional-execution (STE) operation in accordance with an embodiment of the present invention. Note that the system allows nested transactions. This flow chart illustrates what takes place during step 302 of the flow chart in FIG. 3. The system starts by determining if the transactional execution status is active (step 402). If the status is not active, the system sets the status to active (step 404) and then sets the nesting-level to zero (step 406). If the status is active at step 402, the system increments the nesting-level and the process continues (step 408).

After setting the nesting-level to zero at step 406, the system checkpoints the register file (step 410). This can involve performing a flash copy operation from register file 103 to register file 104 (see FIG. 1). In addition to checkpointing register values, this flash copy can also checkpoint various state registers associated with the currently executing thread. In general, the flash copy operation checkpoints enough state to be able to restore the state to the state before the beginning of the outermost transaction.

At the same time the register file is checkpointed, the STE operation also causes store buffer 112 to become "gated" (step 412). This allows existing entries in the store buffer to propagate to the memory sub-system, but prevents new store buffer entries generated during transactional execution from doing so.

The system then starts transactional execution (step 414), which involves load-marking and store-marking cache lines, if necessary, as well as monitoring data references in order to detect interfering references.

Load-Marking Process

Figure 5:
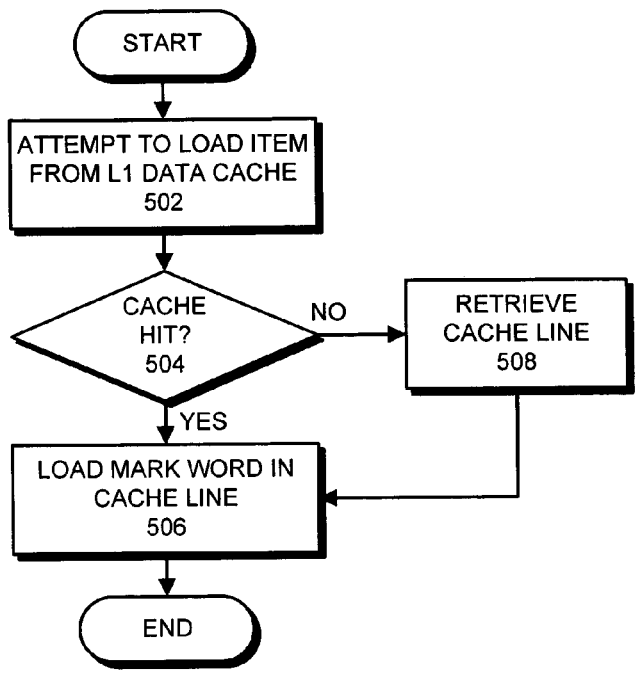
FIG. 5 presents a flow chart illustrating how load-marking is performed during transactional execution in accordance with an embodiment of the present invention.

FIG. 5 presents a flow chart illustrating how load-marking is performed during transactional execution in accordance with an embodiment of the present invention. During transactional execution, the system performs a load operation. In performing this load operation if the load operation has been identified as a load operation that needs to be load-marked, the system first attempts to load a data item from L1 data cache 115 (step 502). If the load causes a cache hit, the system "load-marks" the corresponding word in the cache line in L1 data cache 115 (step 506). This involves setting the load-marking bit for the cache line. Otherwise, if the load causes a cache miss, the system retrieves the word accessed in the cache line from further levels of the memory hierarchy (step 508), and proceeds to step 506 to load-mark the cache line in L1 data cache 115.

Store-Marking Process

Figure 6:
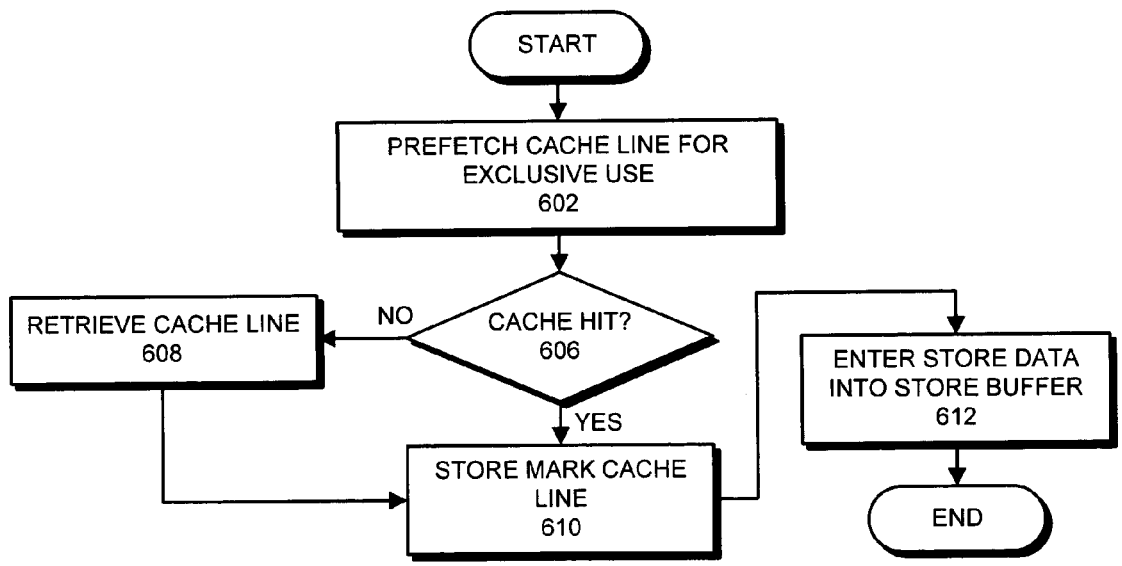
FIG. 6 presents a flow chart illustrating how store-marking is performed during transactional execution in accordance with an embodiment of the present invention.

FIG. 6 presents a flow chart illustrating how store-marking is performed during transactional execution in accordance with an embodiment of the present invention. During transactional execution, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. If the corresponding line is in L2 cache 120 (cache hit), the system "store-marks" the corresponding cache line in L2 cache 120 (step 610). This involves setting the store-marking bit for the cache line. Otherwise, if the corresponding line is not in L2 cache 120 (cache miss), the system retrieves the cache line from further levels of the memory hierarchy (step 608) and then proceeds to step 610 to store-mark the cache line in L2 cache 120.

Next, after the cache line is store-marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store marked by a given thread can be read by other threads. Note that this may cause the given thread to fail while the other threads continue.

Commit Operation

Figure 7:
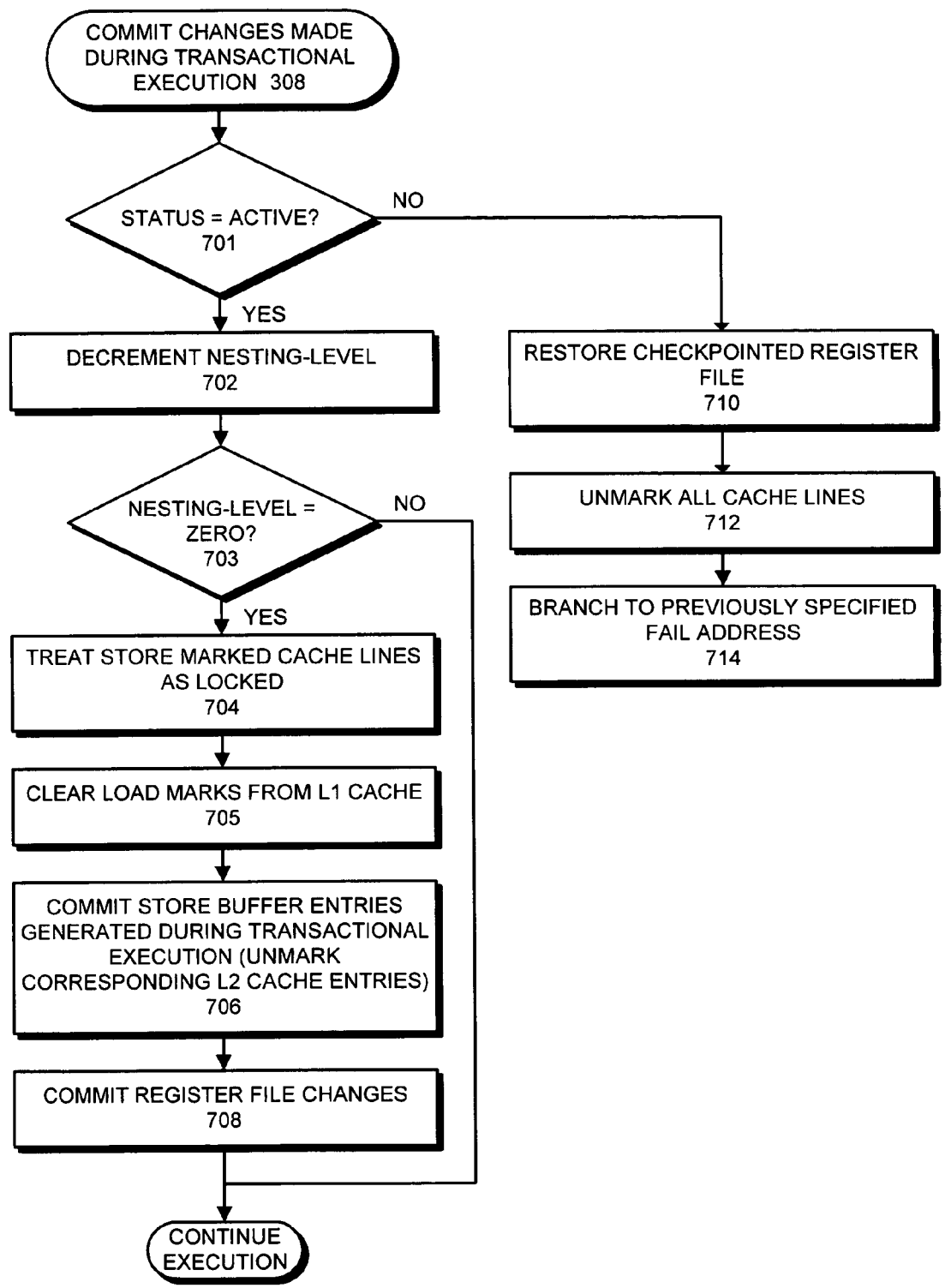
FIG. 7 presents a flow chart illustrating how a commit operation is performed in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by determining if the transactional execution status is active (step 701). If not, the commit operation is terminated. This involves: restoring the checkpointed register file (step 710); unmarking cache lines (step 712); and branching to the fail address specified by the preceding start-transactional-execution instruction (step 714). On the other hand, if the status is active, the system decrements the nesting-level (step 702). Next, the system determines if the nesting-level is zero (step 703). If not, normal transactional execution resumes past the commit instruction.

If the nesting-level is zero, the system treats store-marked cache lines as though they are locked (step 704). This means other threads that request a store-marked line must wait until the line is no longer locked before they can access the line. This is similar to how lines are locked in conventional caches. Next, the system clears load-marks from L1 data cache 115 (step 705).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1.

In order to keep hardware support simple, we cannot tell after-the-fact which nested transaction loaded or stored a particular address, and we do not provide a way to abort a nested transaction without also aborting its containing transactions. This allows the present invention to be easily integrated with previous designs because a single store buffer is sufficient.

One embodiment of the present invention provides a commit-and-start-new-transaction instruction, which atomically commits the transaction's stores, removing them from the transaction's write set, but leaving the transaction's read set unaffected. This instruction thus ensures that any side-effects take place immediately, while allowing the transaction to "stay alive" for further processing (e.g., to continue searching the list after removing a node from it). Note that when a commit-and-start-new-transaction instruction is executed within a top-level transaction, the commit-and-start-new-transaction instruction behaves just like a commit, except that it does not clear load marks.

A commit-and-start-new-transaction instruction takes effect only when issued within a top-level transaction. Any other use can either be treated as an error, or ignored. Either option is consistent with the present invention. However, choosing to make this an error is more conservative, as it will prevent programmers from "fooling themselves" into thinking that the resources used by stores executed thus far in a nested transaction have been released. Apart from resource limitations, simply ignoring this instruction in nested transactions preserves the desired semantics.

The system also provides a release instruction that releases a specific address. A release (a) instruction releases address a from the transaction if a has been loaded but not stored by the transaction, even if a has been loaded by containing transactions.

Discarding Changes

Figure 8:
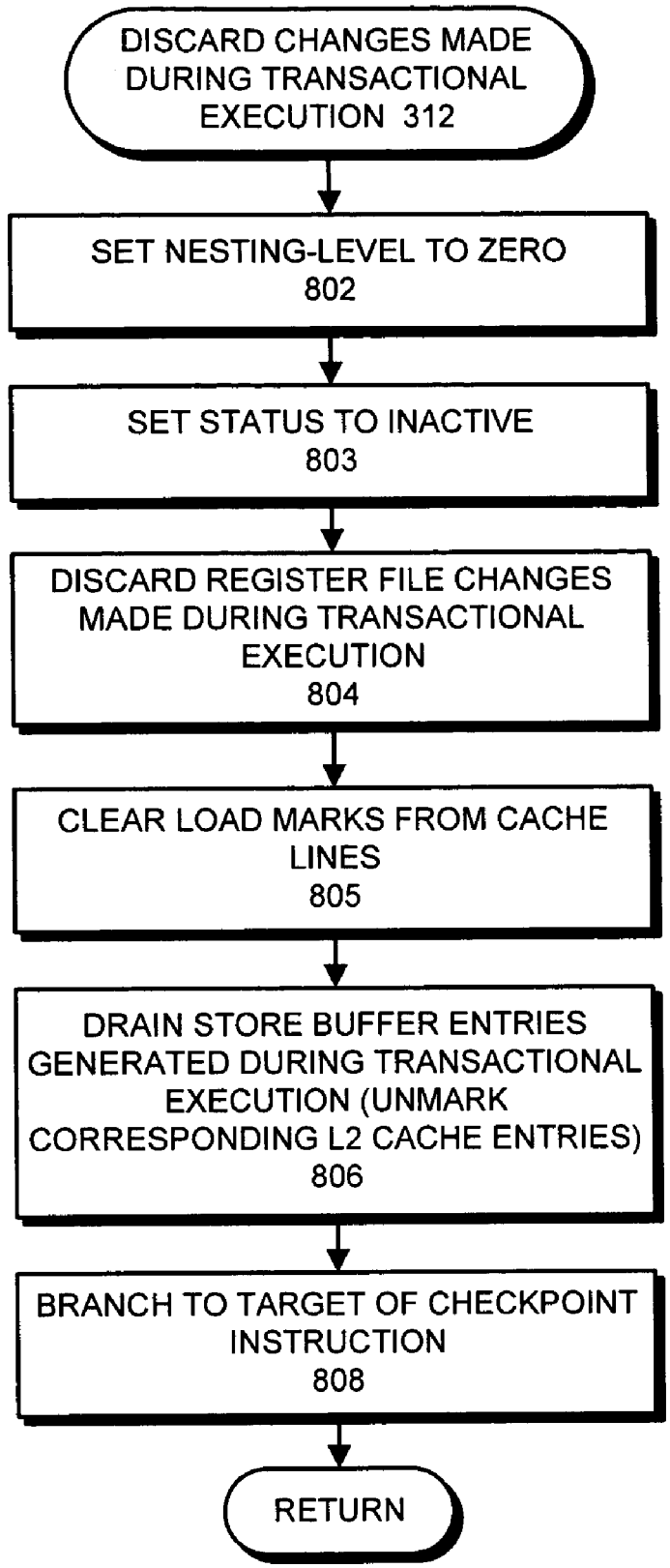
FIG. 8 presents a flow chart illustrating how changes are discarded after transactional execution completes unsuccessfully in accordance with an embodiment of the present invention.

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load-marks from cache lines in L1 data cache 115 (step 804), and drains store buffer entries generated during transactional execution without committing them to the memory hierarchy (step 806).

At the same time, the system unmarks corresponding L2 cache lines. Finally, in one embodiment of the present invention, the system branches to a target location specified by the outermost STE instruction (step 808). The code at this target location optionally attempts to re-execute the critical section (as is described above with reference to step 314 of FIG. 1) or takes other action in response to the failure, for example backing off to reduce contention.

Monitored Load Instructions

FIG. 9A presents a flow chart illustrating how monitored and unmonitored load instructions are generated in accordance with an embodiment of the present invention. This process takes place when a program is being generated to support transactional execution. For example, in one embodiment of the present invention, a compiler or virtual machine automatically generates native code to support transactional execution. In another embodiment, a programmer manually generates code to support transactional execution.

The system first determines whether a given load operation within a sequence of instructions to be transactionally executed needs to be monitored (step 902). In one embodiment of the present invention, the system determines whether a load operation needs to be monitored by determining whether the load operation is directed to a heap. Note that a heap contains data that can potentially be accessed by other threads. Hence, loads from the heap need to be monitored to detect interference. In contrast, loads from outside the heap, (for example, from the local stack) are not directed to data that is shared by other threads, and hence do not need to be monitored to detect interference.

One embodiment of the present invention determines whether a load operation needs to be monitored at the programming-language level, by examining a data structure associated with the load operation to determine whether the data structure is a "protected" data structure for which loads need to be monitored, or an "unprotected" data structure for which loads do not need to be monitored.

In yet another embodiment, the system allows a programmer to determine whether a load operation needs to be monitored.

If the system determines that a given load operation needs to be monitored, the system generates a "monitored load" instruction (step 904). Otherwise, the system generates an "unmonitored load" instruction (step 906).

There are a number of different ways to differentiate a monitored load instruction from an unmonitored load instruction. (1) The system can use the op code to differentiate a monitored load instruction from an unmonitored load instruction. (2) Alternatively, the system can use the address of the load instruction to differentiate between the two types of instructions. For example, loads directed to a certain range of addresses can be monitored load instructions, whereas loads directed to other address can be unmonitored load instructions.

Also note that an unmonitored load instruction can either indicate that no other thread can possibly interfere with the load operation, or it can indicate that interference is possible, but it is not a reason to fail. (Note that in some situations, interfering accesses to shared data can be tolerated.)

FIG. 9B presents a flow chart illustrating how monitored and unmonitored load instructions are executed in accordance with an embodiment of the present invention. The system first determines whether the load instruction is a monitored load instruction or an unmonitored load instruction (step 910). This can be accomplished by looking at the op code of the load instruction, or alternatively, looking at the address for the load instruction. Note that the address can be examined by comparing the address against boundary registers, or possibly examining a translation lookaside buffer (TLB) entry for the address to determine if the address falls within a monitored range of addresses.

If the load instruction is a monitored load instruction, the system performs the corresponding load operation and load marks the associated word in the cache line (step 914). Otherwise, if the load instruction is an unmonitored load instruction, the system performs the load operation without load-marking the associated word within the cache line (step 916).

In a variation of this embodiment, the system does not allow an unmarked load operation from the current thread to cause other threads to fail transactional execution. This can be accomplished by propagating additional information during the coherency transactions associated with the load operation to ensure that the load operation does not cause another thread to fail.

Monitored Store Instructions

Figure 10A:
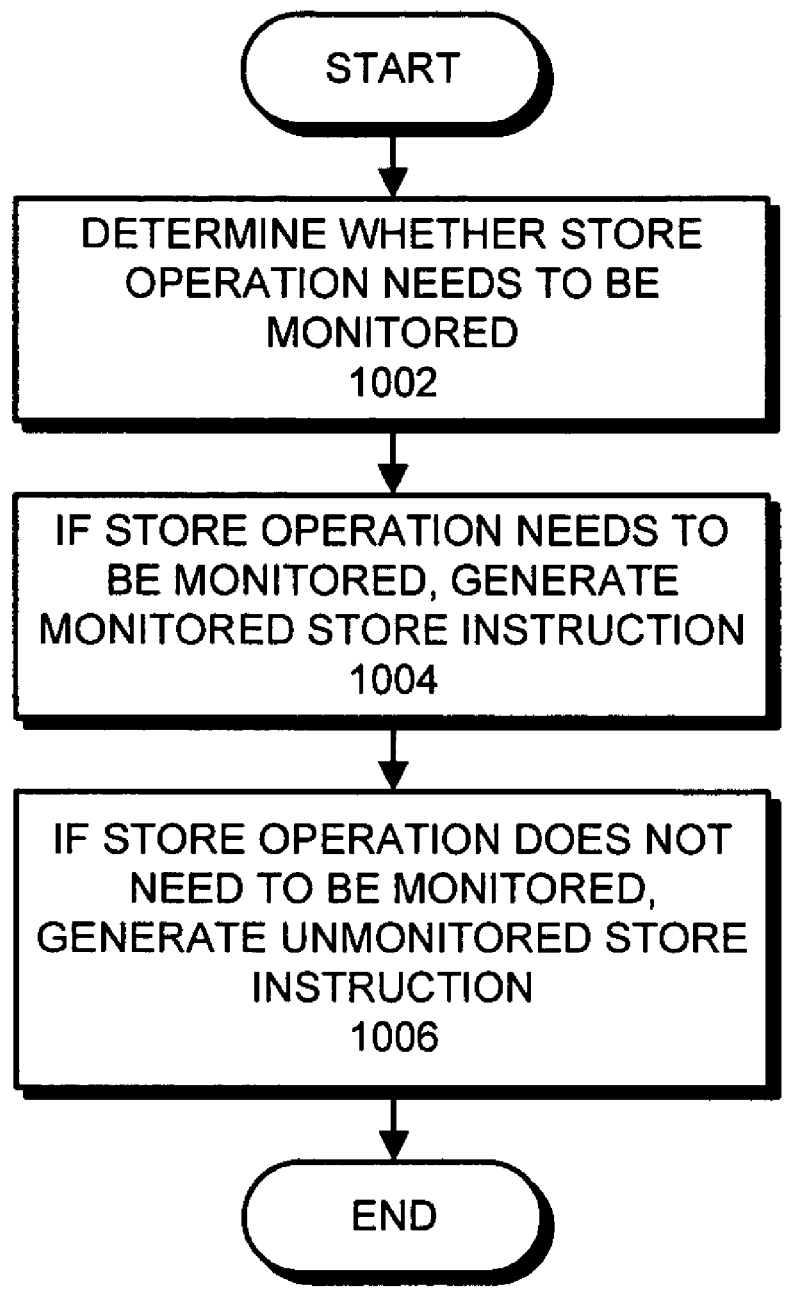
FIG. 10A presents a flow chart illustrating how monitored and unmonitored store instructions are generated in accordance with an embodiment of the present invention.

FIG. 10A presents a flow chart illustrating how monitored and unmonitored store instructions are generated in accordance with an embodiment of the present invention. As was described above for load operations, this process can take place when a compiler or virtual machine automatically generates native code to support transactional execution, or when a programmer manually generates code to support transactional execution.

The system first determines whether a store operation within a sequence of instructions to be transactionally executed needs to be monitored (step 1002). This determination can be made in the based on the same factors as for load instructions.

If the system determines that a store operation needs to be monitored, the system generates a "monitored store" instruction (step 1004). Otherwise, the system generates an "unmonitored store" instruction (step 1006).

Note that monitored store instructions can be differentiated from unmonitored store instructions in the same way that monitored load instructions can be differentiated from unmonitored load instructions, for example the system can use different op codes or different address ranges.

Figure 10B:
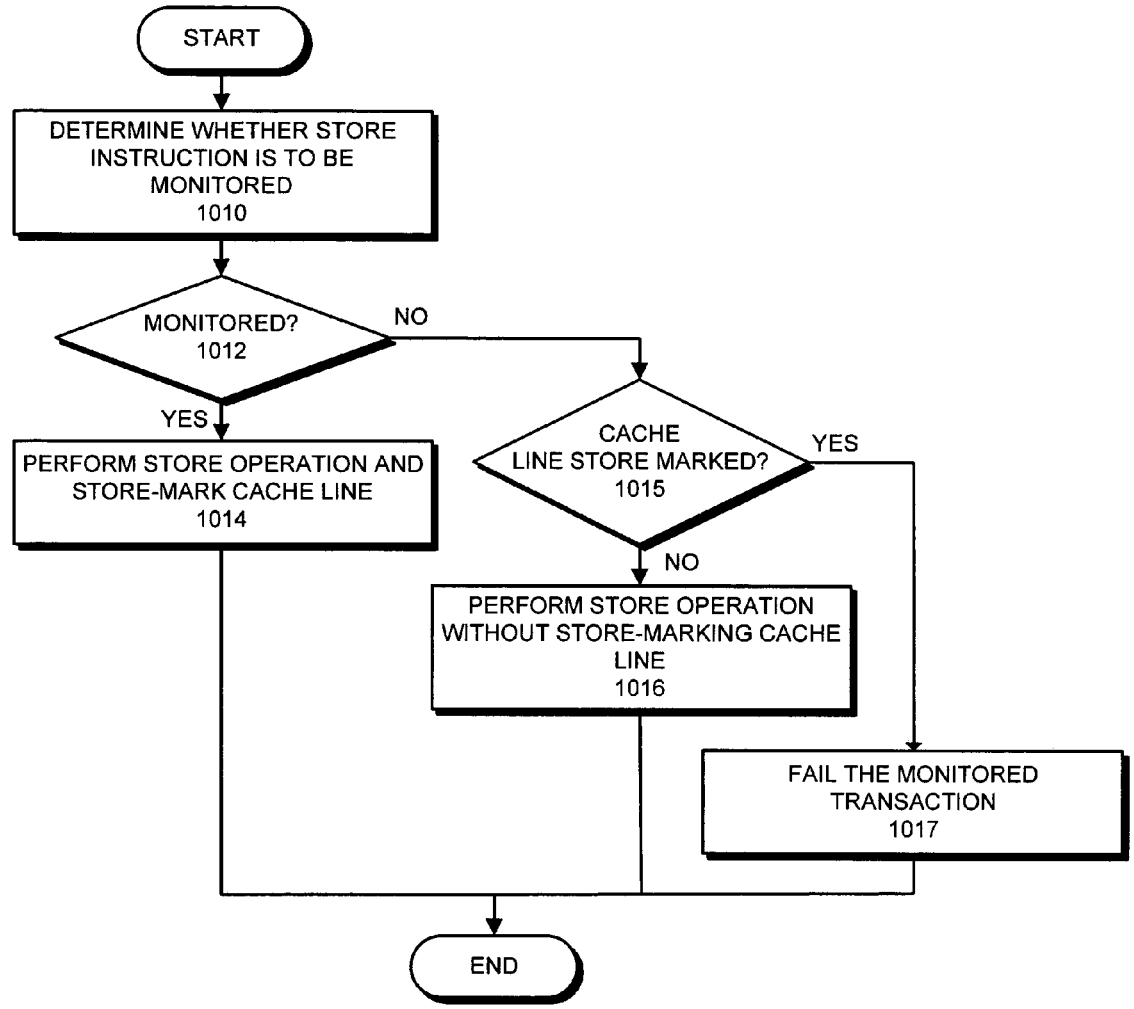
FIG. 10B presents a flow chart illustrating how monitored and unmonitored store instructions are executed in accordance with an embodiment of the present invention.

FIG. 10B presents a flow chart illustrating how monitored and unmonitored store instructions are executed in accordance with an embodiment of the present invention. The system first determines whether the store instruction is a monitored store instruction or an unmonitored store instruction (step 1010). This can be accomplished by looking at the op code for the store instruction, or alternatively, looking at the address for the store instruction. If the store instruction is a monitored store instruction, the system performs the corresponding store operation to a gated store buffer, or in another way so that it can be later undone, and store marks the associated cache line (step 1014). Otherwise, if the store instruction is an unmonitored store instruction, the system determines if the cache line is store-marked (step 1015). If not, the system performs the store operation without store-marking the cache line (step 1016). Otherwise, the system fails the monitored transaction (step 1017). Note that in one variation of the present invention, a non-transactional store to a memory location that is already store-marked is treated as transactional.

Note that a store-marked cache line can indicate one or more of the following: (1) loads from other threads to the cache line should be monitored; (2) stores from other threads to the cache line should be monitored; or (3) stores to the cache line should be buffered until the transactional execution completes.

Release Instruction

Figure 11A:
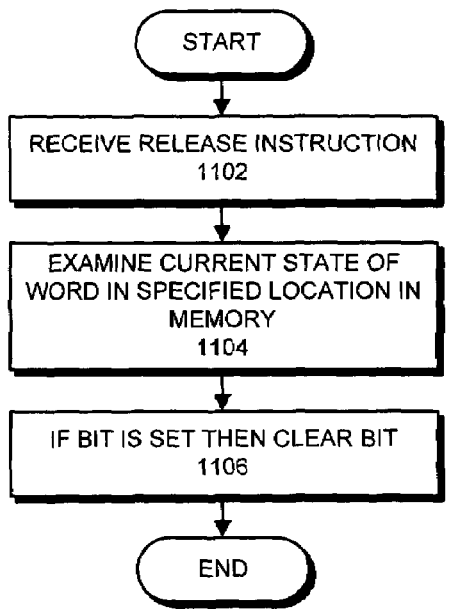
FIG. 11A presents a flow chart illustrating how a release instruction operates in accordance with an embodiment of the present invention.

FIG. 11A presents a flow chart illustrating how a release instruction operates in accordance with an embodiment of the present invention. First, the system receives a release instruction during transactional execution of a sequence of instructions within an application (step 1102). Next, the system examines the current state of the word in the specified location in memory (step 1104). If the bit is set, the system clears the bit (step 1106). Furthermore, if all bits associated with a cache line are cleared, the cache line is unmarked by virtue thereof.

Hence, the present invention allows a programmer (or compiler/interpreter) to generate special load instructions and occasional release instructions, which release load-marked words from monitoring during transactional execution.

Unmarking load-marked cache lines has a number of benefits. For example, cache lines that are unmarked do not have to remain in cache memory until the transaction completes (or is killed), and false failures are less likely to occur due to a large number of cache lines being marked. Once a cache line is unmarked, another transaction on another processor can modify the cache line, causing it to be evicted from the local cache, but this does not need to cause the local transaction to abort.

Commit-and-Start-New-Transaction Instruction

Figure 11B:
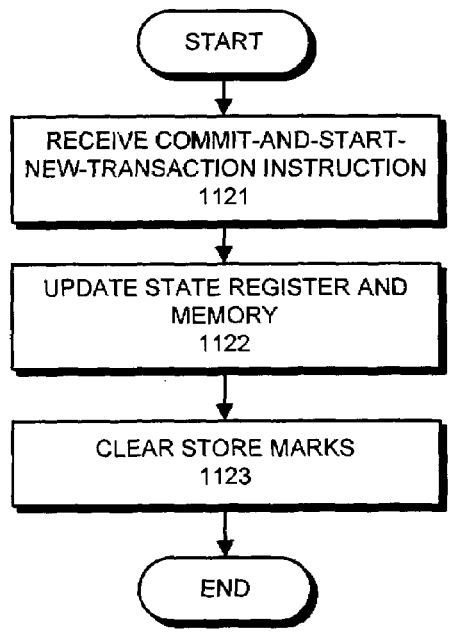
FIG. 11B presents a flow chart illustrating how a commit-and-start-new-transaction instruction operates in accordance with an embodiment of the present invention.

FIG. 11B presents a flow chart illustrating how a commit-and-start-new-transaction instruction operates in accordance with an embodiment of the present invention. First, the system receives a commit-and-start-new-transaction instruction during transactional execution of a sequence of instructions within an application (step 1121). Next, the system performs all relevant updates to the state register and to the memory (step 1122) and all associated store marks are cleared (step 1123). (Note that updates to memory can involve committing stores from the store buffer to memory, or at least "ungating" them so that they subsequently drain to memory.) As mentioned previously, the commit-and-start-new-transaction instruction leaves the transaction's read set unaffected.

Exemplary Applications

The present invention has some beneficial side effects when applied to a linked list. In particular, nodes can be marked for deletion and subsequently deleted during a lookup scan through the linked list.

Marking Nodes for Deletion

Figure 12:
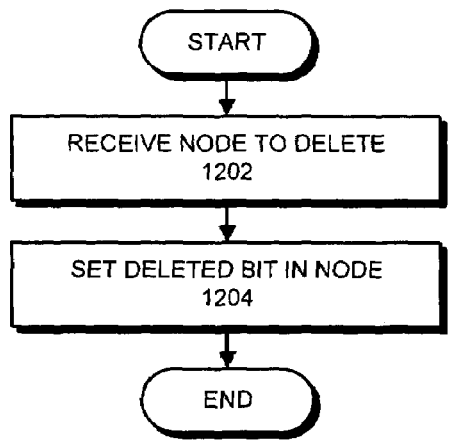
FIG. 12 presents a flow chart illustrating how a linked-list node is marked for deletion in accordance with an embodiment of the present invention.

FIG. 12 presents a flow chart illustrating how a node is marked for deletion in accordance with an embodiment of the present invention. Marking the node for deletion starts when a node identifier is received for deletion (step 1202). In response to receiving the node identifier, the delete bit associated with the node is set (step 1204).

Sequential Deletion During Lookup

Figure 13:
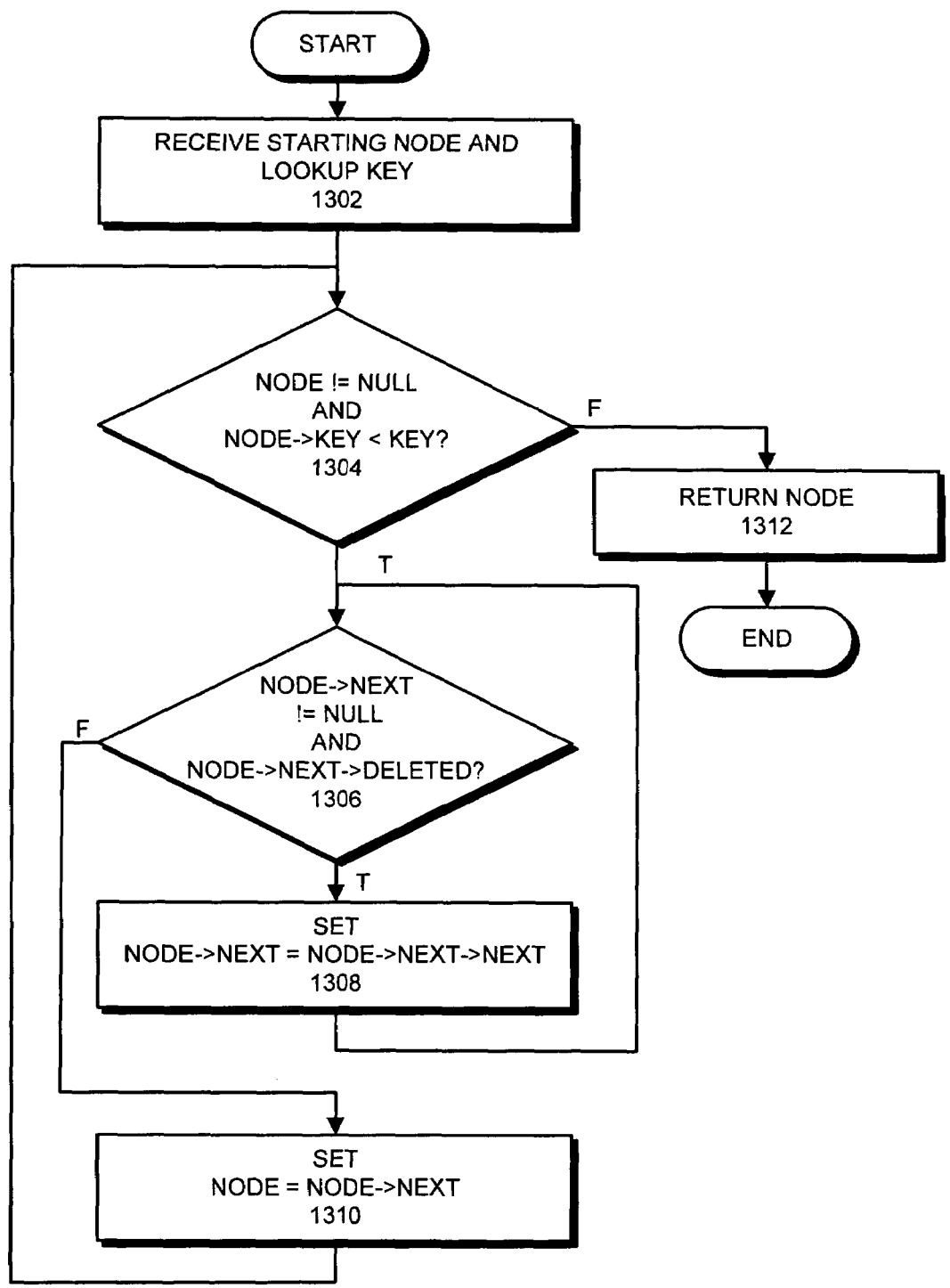
FIG. 13 presents a flowchart illustrating the process of performing a sequential lookup with benevolent side-effects in accordance with an embodiment of the present invention.

FIG. 13 presents a flowchart illustrating the process of performing a sequential lookup into a linked list with benevolent side-effects. During this process, it is assumed that the linked list is ordered and that it has a sentinel node whose key is smaller than any possible key and a sentinel node whose key is larger than any possible key. Performing a sequential lookup starts when a starting node and a lookup key are received (step 1302). Next, the system determines if the node is not equal to NULL and the node key is less than the lookup key (step 1304). If not, the process of performing a sequential lookup is terminated and the node is returned (step 1312). The process of performing a sequential lookup can be terminated because there are no more nodes; because a node containing the search key has been found; or because it has been determined that the search key is not in the list.

If both conditions are true at step 1304, the system then determines if the next node is not equal to NULL and if the next node is marked as deleted (step 1306). If both conditions are true, the system deletes the following node by setting the next pointer in the current node to equal the next pointer from the following node (step 1308). After deleting the node, the system returns to step 1306 to determine if there is another node marked as deleted.

After the last node has been found or after an undeleted node has been found, the system sets the current node to equal the next node (step 1310). The process then continues from step 1304. Note that these steps provide the benevolent side-effect of deleting nodes that have been marked as deleted during a lookup operation.

Transactional Deletion During Lookup

Figure 14:
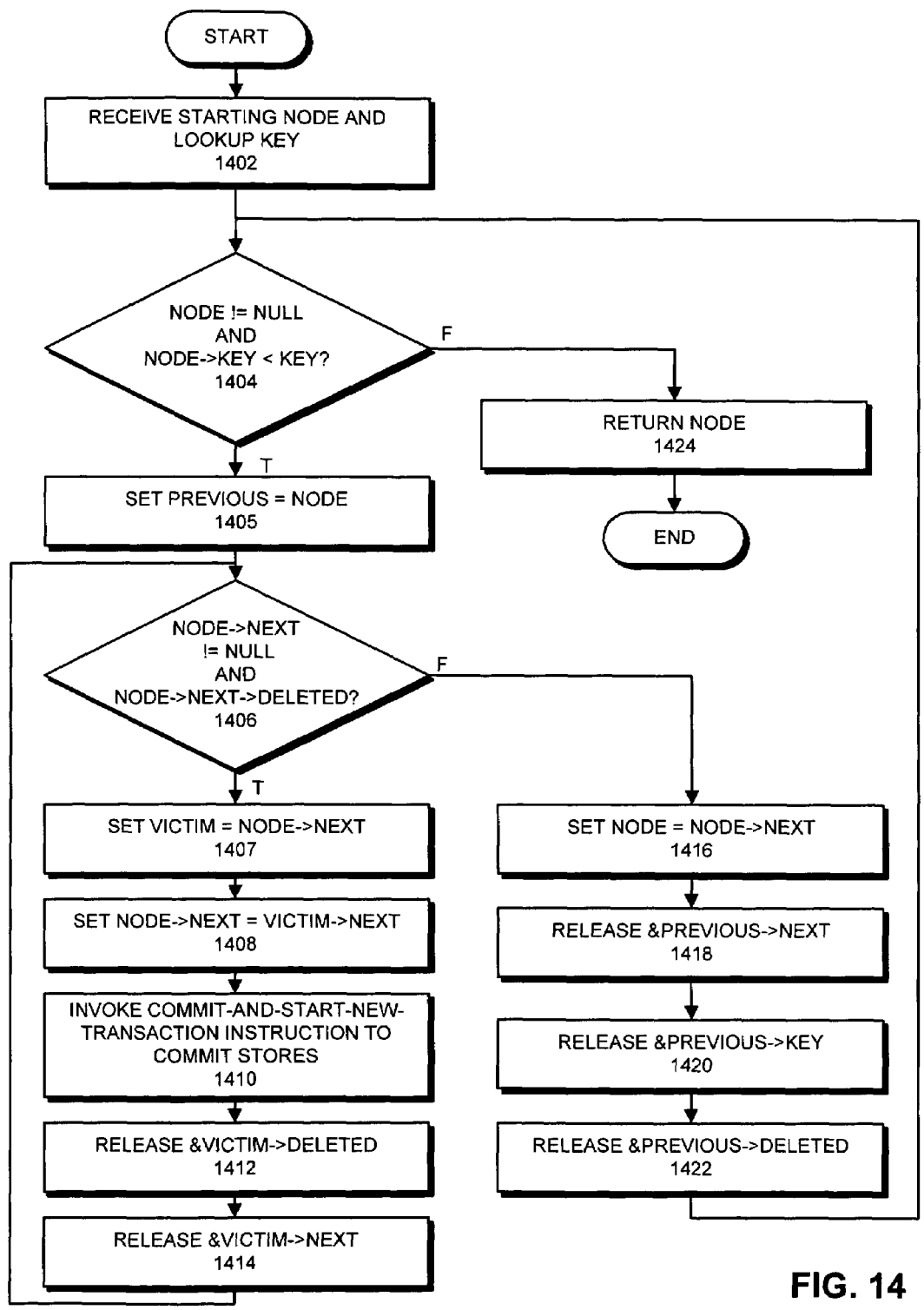
FIG. 14 presents a flowchart illustrating the process of performing a transactional lookup with benevolent side-effects in accordance with an embodiment of the present invention.

FIG. 14 presents a flowchart illustrating the process of performing a transactional lookup into a linked list with benevolent side-effects in accordance with an embodiment of the present invention. Performing a transactional lookup starts when a starting node and a lookup key are received (step 1402). Next, the system determines if the node is not equal to NULL and the node key is less than the lookup key (step 1404). If not, the process of performing the transactional lookup is terminated and the node is returned (step 1424). It is assumed that the linked list is ordered and that it has a sentinel node whose key is smaller than any possible key and a sentinel node whose key is larger than any possible key.

If both conditions are true at step 1404, the system then sets a previous pointer to equal the current node (step 1405). Next, the system determines if the next node is not equal to NULL and if the next node is marked as deleted (step 1406). If both conditions are true, the system sets a victim node pointer to equal the node's next pointer (step 1407). The system then sets the node's next pointer to equal the victim's next pointer (step 1408). The system then invokes the commit-and-start-new-transaction instruction in order to commit the store performed to remove the deleted node, while preserving the read set of the transaction to allow continued list processing (step 1410). After committing the store, the system releases the victim's deleted pointer (step 1412) and releases the victim's next pointer (step 1414). The process then continues from step 1406 to determine if additional nodes have been deleted.

After the last node has been found or after an undeleted node has been found, the system sets the current node to equal the next node (step 1416) and releases &previous→next (step 1418), &previous→key (step 1420), and &previous→deleted (step 1422). The system then returns to step 1404 to continue the transactional lookup.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for releasing a memory location from transactional program execution, comprising:

executing a sequence of instructions during transactional program execution, wherein memory locations involved in the transactional program execution are monitored to detect interfering accesses from other threads, and wherein changes made during transactional execution are not committed until transactional execution completes without encountering an interfering data access from another thread;

encountering a release instruction for a memory location during the transactional program execution; and in response to the release instruction, modifying state information within the processor to release the memory location from monitoring during transactional program execution.

2. The method of claim 1, further comprising executing a commit-and-start-new-transaction instruction, wherein the commit-and-start-new-transaction instruction atomically commits the transaction's stores, thereby removing them from the transaction's write set while the transaction's read set remains unaffected.

3. The method of claim 1, wherein modifying state information within the processor involves changing the state of a corresponding load-marked word within a cache line to indicate that the load-marked word can be released from monitoring; and wherein if all load-marked words within a cache line are released from monitoring, the cache line can be evicted without aborting the transactional program execution.

4. The method of claim 1, wherein a load-marked cache line contains a bit for each word indicating whether the word has been load-marked; and wherein if all bits associated with the load-marked cache line indicate that the associated words are not load-marked, the load-marked cache line can be evicted without aborting the transactional execution.

5. The method of claim 1, further comprising:

setting a nesting-level variable to zero at the start of transactional program execution, wherein the nesting-level variable indicates the depth of nested start-transactional-execution instructions;

incrementing the nesting-level variable when a subsequent start-transactional-execution instruction is encountered; and decrementing the nesting-level variable when a commit transactional execution instruction is encountered;

wherein if the nesting-level variable becomes zero, the cache lines associated with the transactional execution are committed to memory.

6. The method of claim 1, wherein upon encountering a load instruction during the transactional execution, the method further comprises:

performing the corresponding load operation; and if the load instruction is a monitored load instruction, load-marking a corresponding word in the cache line to facilitate subsequent detection of an interfering data access to the cache line from another thread.

7. The method of claim 1, wherein if an interfering data access from another thread is encountered during transactional execution, the method further comprises:

discarding changes made during the transactional execution; and attempting to re-execute the sequence of instructions.

8. The method of claim 1, wherein if an interfering data access from another thread is encountered during transactional execution, control branches to a previously-specified fail address.

9. The method of claim 1, wherein if transactional execution completes without encountering an interfering data access from another thread, the method further comprises:

committing changes made during the transactional execution; and resuming normal non-transactional execution of the program past the sequence of instructions.

10. The method of claim 1, wherein an interfering data access can include:

a store by another thread to a cache line that has been load-marked by a thread; and a load or a store by another thread to a cache line that has been store-marked by the thread.

11. A computer-readable storage medium storing instructions that when executed by a computer cause the computer to perform a method for selectively unmarking load-marked words within cache lines during transactional execution, wherein load-marked words within cache lines are monitored during transactional execution to detect interfering accesses from other threads, the method comprising:

executing a sequence of instructions during transactional program execution, wherein memory locations involved in the transactional program execution are monitored to detect interfering accesses from other threads, and wherein changes made during transactional execution are not committed until transactional execution completes without encountering an interfering data access from another thread;

encountering a release instruction for a memory location during the transactional program execution; and in response to the release instruction, modifying state information within the processor to release the memory location from monitoring during transactional program execution.

12. The computer-readable storage medium of claim 11, the method further comprising executing a commit-and-start-new-transaction instruction, wherein the commit-and-start-new-transaction instruction atomically commits the transaction's stores, thereby removing them from the transaction's write set while the transaction's read set remains unaffected.

13. The computer-readable storage medium of claim 11, wherein modifying state information within the processor involves changing the state of a corresponding load-marked word within a cache line to indicate that the load-marked word can be released from monitoring; and wherein if all load-marked words within a cache line are released from monitoring, the cache line can be evicted without aborting the transactional program execution.

14. The computer-readable storage medium of claim 11, wherein a load-marked cache line contains a bit for each word indicating whether the word has been load-marked; and wherein if all bits associated with the load-marked cache line indicate that the associated words are not load-marked, the load-marked cache line can be evicted without aborting the transactional execution.

15. The computer-readable storage medium of claim 11, the method further comprising:

setting a nesting-level variable to zero at the start of transactional program execution, wherein the nesting-level variable indicates the depth of nested start-transactional-execution instructions;
incrementing the nesting-level variable when a subsequent start-transactional-execution instruction is encountered; and
decrementing the nesting-level variable when a commit transactional execution instruction is encountered;
wherein if the nesting-level variable becomes zero, the cache lines associated with the transactional execution are committed to memory.

16. The computer-readable storage medium of claim 11, wherein upon encountering a load instruction during the transactional execution, the method further comprises:
performing the corresponding load operation; and
if the load instruction is a monitored load instruction, load-marking a corresponding word in the cache line to facilitate subsequent detection of an interfering data access to the cache line from another thread.

17. The computer-readable storage medium of claim 11, wherein if an interfering data access from another thread is encountered during transactional execution, the method further comprises:
discarding changes made during the transactional execution; and
attempting to re-execute the sequence of instructions.

18. The computer-readable storage medium of claim 11, wherein if an interfering data access from another thread is encountered during transactional execution, control branches to a previously-specified fail address.

19. The computer-readable storage medium of claim 11, wherein if transactional execution completes without encountering an interfering data access from another thread, the method further comprises:
committing changes made during the transactional execution; and
resuming normal non-transactional execution of the program past the sequence of instructions.

20. The computer-readable storage medium of claim 11, wherein an interfering data access can include:
a store by another thread to a cache line that has been load-marked by a thread; and
a load or a store by another thread to a cache line that has been store-marked by the thread.

21. An apparatus for releasing a memory location from transactional program execution, comprising:
an execution mechanism configured to execute executing a sequence of instructions during transactional program execution, wherein memory locations involved in the transactional program execution are monitored to detect interfering accesses from other threads, and wherein changes made during transactional execution are not committed until transactional execution completes without encountering an interfering data access from another thread; and
a modifying mechanism configured to modify state information within the processor to release the memory location from monitoring upon encountering a release instruction for a memory location during the transactional program execution.

22. The apparatus of claim 21, wherein the execution mechanism is further configured to execute a commit-and-start-new-transaction instruction, wherein the commit-and-start-new-transaction instruction atomically commits the transaction's stores, thereby removing them from the transaction's write set while the transaction's read set remains unaffected.

23. The apparatus of claim 21,
wherein modifying state information within the processor involves changing the state of a corresponding load-marked word within a cache line to indicate that the load-marked word can be released from monitoring; and
wherein if all load-marked words within a cache line are released from monitoring, the cache line can be evicted without aborting the transactional program execution.

24. The apparatus of claim 21,
wherein a load-marked cache line contains a bit for each word indicating whether the word has been load-marked; and
wherein if all bits associated with the load-marked cache line indicate that the associated words are not load-marked, the load-marked cache line can be evicted without aborting the transactional execution.

25. The apparatus of claim 21, further comprising:
a setting mechanism configured to set a nesting-level variable to zero at the start of transactional program execution, wherein the nesting-level variable indicates the depth of nested start-transactional-execution instructions;
an incrementing mechanism configured to increment the nesting-level variable when a subsequent start-transactional-execution instruction is encountered; and
a decrementing mechanism configured to decrement the nesting-level variable when a commit transactional execution instruction is encountered;
wherein if the nesting-level variable becomes zero, the cache lines associated with the transactional execution are committed to memory.

26. The apparatus of claim 21, further comprising:
a loading mechanism configured to perform the corresponding load operation; and
a load-marking mechanism configured to load-mark a corresponding word in the cache line to facilitate subsequent detection of an interfering data access to the cache line from another thread.

27. The apparatus of claim 21, further comprising:
a discarding mechanism configured to discard changes made during the transactional execution; and
a re-execution mechanism configured to attempt re-executing the sequence of instructions.

28. The apparatus of claim 21, further comprising a control mechanism configured to branch to a previously-specified fail address if an interfering data access from another thread is encountered during transactional execution.

29. The apparatus of claim 21, further comprising:
a committing mechanism configured to commit changes made during the transactional execution; and
a resuming mechanism configured to resume normal non-transactional execution of the program past the sequence of instructions.

30. The apparatus of claim 21, wherein an interfering data access can include:
a store by another thread to a cache line that has been load-marked by a thread; and
a load or a store by another thread to a cache line that has been store-marked by the thread.

* * * * *